United States Patent [19]

Elfstrom et al.

[11] Patent Number: 5,680,125
[45] Date of Patent: Oct. 21, 1997

[54] SENSING THE STEERING ANGLE WHILE TRANSPORTING AIRCRAFT ON THE GROUND

[76] Inventors: Bo Elfstrom, Rudedammsgatan 22, S-392 47, Kalmar; Sten Lofving, Klamparegatan 5, S-413 17, Gothenburg, both of Sweden

[21] Appl. No.: 588,029

[22] Filed: Jan. 17, 1996

[30] Foreign Application Priority Data

Jan. 17, 1995 [SE] Sweden ................................. 9500131

[51] Int. Cl.$^6$ .................................................. G08B 21/00
[52] U.S. Cl. ........................ 340/958; 340/945; 244/1 R; 244/50; 414/426
[58] Field of Search ............................... 340/958, 945, 340/465, 686, 540; 244/1 R, 50; 250/571, 221, 491.1, 224; 414/426; 180/167, 169

[56] References Cited

U.S. PATENT DOCUMENTS

| | | | |
|---|---|---|---|
| 4,581,607 | 4/1986 | Seko et al. | 340/576 |
| 4,745,410 | 5/1988 | Schuller et al. | 340/958 |
| 4,794,536 | 12/1988 | Eto et al. | 364/424.05 |
| 4,994,681 | 2/1991 | Mann | 250/561 |
| 4,999,616 | 3/1991 | Martin et al. | 340/67 X |
| 5,302,074 | 4/1994 | Elfstrom | 414/427 |
| 5,516,252 | 5/1996 | Francke et al. | 414/426 |

Primary Examiner—Jeffery Hofsass
Assistant Examiner—Benjamin C. Lee
Attorney, Agent, or Firm—Nixon & Vanderhye P.C.

[57] ABSTRACT

The acceptability of the steering angle between the nose wheel of an aircraft and the longitudinal axis of the aircraft during transportation of the aircraft on the ground using a wheeled vehicle (with or without a tow bar) is provided. The wheeled vehicle has a source of collimated radiation (such as a laser beam emitting unit, or an LED or other light source with a lens and/or aperture system) which directs a beam on a surface of the aircraft having at least two significantly different collimated radiation reflecting areas (e.g. a light material arc bounded by dark material marks). In response to radiation from the collimated beam, or lack thereof, reflected from the surface of the aircraft back to a receiver on the wheeled vehicle, it can be determined if the nose wheel steering angle is within an acceptable range (typically no more than between about 60°–80°, which would damage the nose wheel). Two beam sources and receivers may be provided, and other information—such as the size of the aircraft (which is proportional to the distance of the laser beam emitting unit from the reflected surface)—may also be calculated. An indicator or device for initiating corrective action may be provided to respond to insufficient reflected radiation received by the receiver.

20 Claims, 3 Drawing Sheets

SENSING THE STEERING ANGLE WHILE TRANSPORTING AIRCRAFT ON THE GROUND

BACKGROUND AND SUMMARY OF THE INVENTION

The present invention relates to a device and method for sensing (and/or measuring or determining) the steering angle during transporting of an aircraft on the ground using a wheeled vehicle. The "steering angle" is defined as the angle between the nose wheel and the longitudinal axis of the aircraft (or a horizontal line perpendicular thereto).

In using a vehicle of the type which is not equipped with a tow bar, in transporting aircraft on the ground it has heretofore been difficult to provide a touch free device for measuring the turning or steering angle in the horizontal plane, in relation to the longitudinal axis of the aircraft. Transporting aircraft with a vehicle which is free of a tow bar is a relatively new method. This is carried out by lifting the nose wheel (or more wheels) off the ground after rendering the hydraulic system for steering the nose wheels inactive, usually by changing the position of a bypass valve disposed on the nose gear and accessible from the outside. However, the hydraulic cylinders for steering are usually activated which means that the greatest steering angle will be limited to about 60°–80°. If a steering force is applied after the maximum steering angle has been reached, this can severely damage the nose gear, even when the force is a relatively moderate one.

The method of moving aircraft on the ground which is most common, uses a tow bar between the vehicle and nose gear. The risk of damage is limited by allowing a weak (breakable) member in the bar and/or in the attachment for the tow bar to the nose gear, which is ruptured when the load is over a threshold amount but is relatively low, and therefore does not effect damage. This requires replacement of the tow bar when broken, however, and is not necessarily always accurate.

The present invention seeks to eliminate the problem discussed above and provide a simple and touch free or remote sensitive device which indicates when the maximum steering angle of the nose wheel with respect to the longitudinal axis of the aircraft is being approached or has been reached during the ground transporting operation, so that damage to the nose wheel of the aircraft is avoided during ground movement with or without a tow bar.

The present invention relates to a simple method and device for measuring the steering angle while transporting an aircraft on the ground using a wheeled vehicle. The apparatus employs at least one source of light emitting a narrow beam (such as, but not limited to, a laser or a narrow beam providing lens or aperture system associated with a multi-frequency light (such as LED) or other electromagnetic wave source), at least one optical receiver, and a plurality of areas on the surface of the body of the aircraft. The areas on the aircraft have different inherent optical reflectivity. The source of light is disposed on the wheeled "tow" vehicle at a predetermined distance from the substantially vertical axis of turning of the nose wheels so that light from the beam hits the areas at different steering angles, the receiver recording different amounts of light reflected at different steering angles dependent upon the different inherent optical abilities of reflection of those areas and generating a unique output signal in response to each amount of light reflected. The output signal is used (e.g. with a computer) to determine the magnitude of said steering angle, and an automatic correction can be initiated, or a warning indicator activated.

According to one aspect of the present invention a method of determining the acceptability of the steering angle between the nose wheel of an aircraft and the longitudinal axis of the aircraft during transportation of the aircraft on the ground using a wheeled vehicle having a source of collimated radiation, the aircraft having a surface defining at least two significantly different collimated radiation reflectivity areas, is provided. The method comprises the steps of: (a) While the wheeled vehicle operatively engages the nose wheel of the aircraft and can effect change in the steering angle thereof, directing a collimated beam of radiation from the wheeled vehicle source toward the surface of the aircraft defining at least two significantly different collimated radiation reflectivity areas. And, (b) in response to radiation from the collimated beam, or lack thereof, reflected from the surface of the aircraft, determining if the nose wheel steering angle is within an acceptable range.

Steps (a) and (b) may be practiced by directing a laser beam toward the surface of the aircraft, and receiving or not receiving on the wheeled vehicle reflected laser light from the laser beam. Typically step (b) is practiced by receiving or not receiving reflected radiation from the collimated beam on the wheeled vehicle.

When the wheeled vehicle is of the type having a tow bar, steps (a) and (b) are practiced by directing the collimated beam from the tow bar toward the surface, and receiving or not receiving the reflected radiation from the collimated beam on the tow bar. Where the wheeled vehicle is of the type not having a tow bar then step (a) is practiced by directing the beam substantially vertically from a position on the wheeled vehicle horizontally displaced from the nose wheel.

The aircraft surface typically includes an arc of light material and areas displaced at least about 40 degrees from the center of the arc on either side thereof of dark material or exterior of the aircraft surface. Step (a) is typically practiced by directing collimated light toward the surface, and step (b) is practiced to receive reflected light from the light material, but little or no reflected light from the dark material or exterior of the aircraft surface.

There may be the further step (c) of activating an alarm if during the practice of step (b) it is determined that the steering angle is outside of an acceptable range (i.e. either at, or approaching given a desired margin of safety, an angle at which damage to the nose gear is likely); and/or of automatically taking corrective action if during the practice of step (b) it is determined that the steering angle is outside of an acceptable range.

The collimated beam of radiation may comprise a first beam, and there may be the further steps of: (c) directing a second beam of collimated radiation toward the aircraft; and (d) in response to radiation from the second collimated beam, or lack thereof, reflected from the surface of the aircraft, combined with reflected radiation, or lack thereof, from the first collimated beam, determining if the nose wheel steering angle is within an acceptable range. Also there may be the further step of using the value of reflected radiation sensed in step (b) to determine the distance of the source of radiation to the surface of the aircraft (e.g. by feeding the value to a computer programmed with empirical data on aircraft size compared to reflectivity, or using developed formula calculations).

The invention also relates to a combination of a wheeled transporting vehicle and aircraft, comprising the following components: An aircraft having a nose wheel, and a surface defining at least two significantly different collimated radiation reflectivity areas. A wheeled vehicle for operatively engaging the nose wheel and transporting the aircraft on the ground. At least one source of collimated radiation mounted for movement with the wheeled vehicle, for directing a beam of collimated radiation from the wheeled vehicle toward the aircraft surface so that the beam may be reflected off the aircraft surface. And, at least one receiver for reflected collimated radiation from the source mounted for movement with the wheeled vehicle.

The source preferably comprises a light source (such as a laser beam emitting unit). In that case the surface on the aircraft comprises an arc of light material, and areas displaced at least about 40° from the center of the arc on either side thereof of dark material, or exterior of the aircraft surface. Preferably the areas are displaced about 40°–80° from the center of the arc, for most conventional aircraft. The laser beam emitting unit is horizontally displaced from the nose wheel received by the vehicle, and is positioned so that the laser beam is substantially vertically directed. An indicator (and/or corrective mechanism) may be connected to the receiver and indicate when the receiver receives insufficient reflective light, indicating that the aircraft nose wheel steering angle is unacceptable (and/or initiating corrective action).

It is the primary object of the present invention to provide for the simple yet effective determination of the acceptability of the steering angle between the nose wheel of an aircraft and the longitudinal axis of the aircraft during transportation of the aircraft on the ground using a wheeled vehicle, so as to avoid damage to the nose wheel. This and other objects of the invention will become clear from an inspection of the detailed description of the invention and from the appended claims.

DETAILED DESCRIPTION OF THE DRAWINGS

Figure 1:
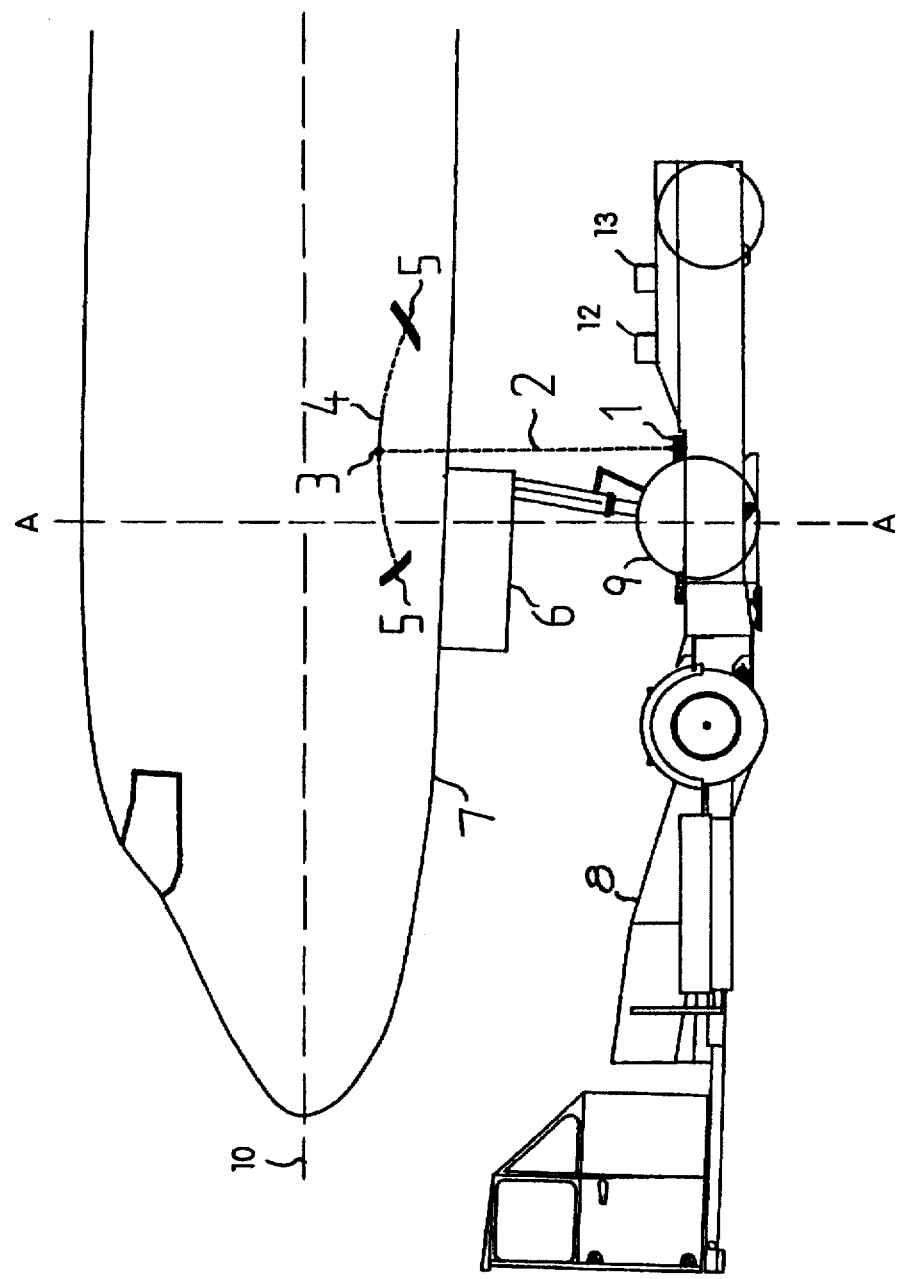
FIG. 1 is a side schematic view of an aircraft, a tow vehicle with an engagement and hosting unit, and an exemplary embodiment of a device according to the present invention.
Figure 2:
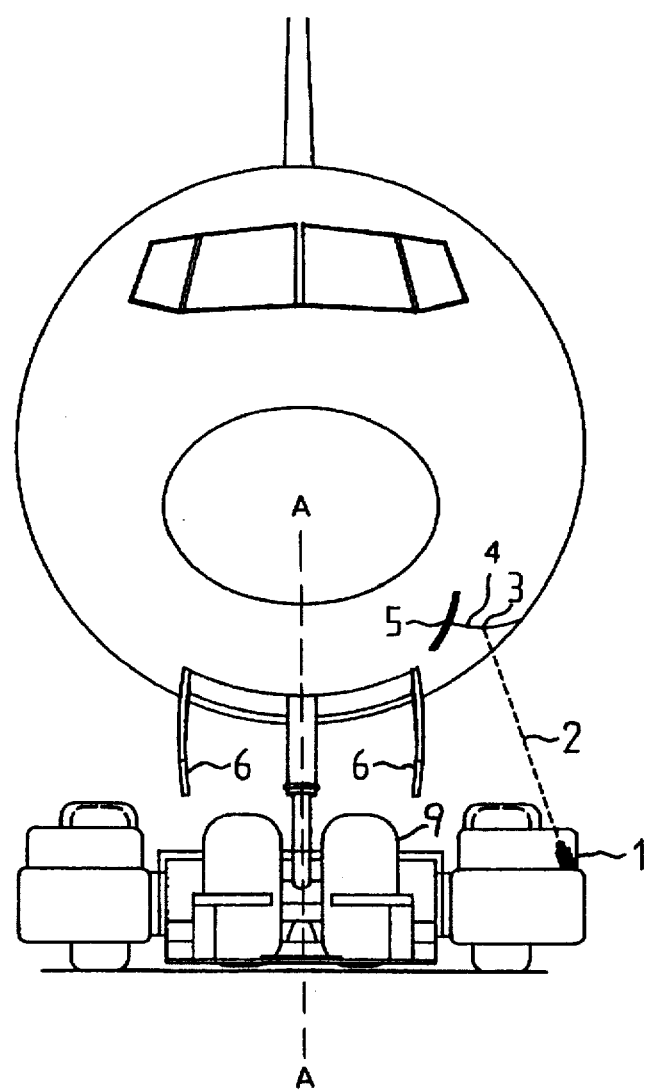
FIG. 2 is a front view of the equipment of FIG. 1.

FIGS. 1 and 2 schematically show the nose portion of a conventional commercial aircraft 7 having a conventional nose wheel or wheels 9, and a wheeled (tow) vehicle 8 for transporting the aircraft 7 relatively short distances along the ground. The vehicle 8 shown has no tow bar and is preferably of the type described in U.S. Pat. 5,302,074 (the disclosure of which is incorporated by reference herein). Alternatively the vehicle may be a conventional type having a tow bar.

The device according to the invention comprises a modulated source of light in the form of a laser unit 1, for instance, the laser unit 1 emitting a narrow beam 2. Other narrow beam sources may also be utilized, such as an LED or other light or electromagnetic propagation source with a lens and/or aperture system to produce a collimating effect on the emitted electromagnetic propagation (radiation).

Figure 3:
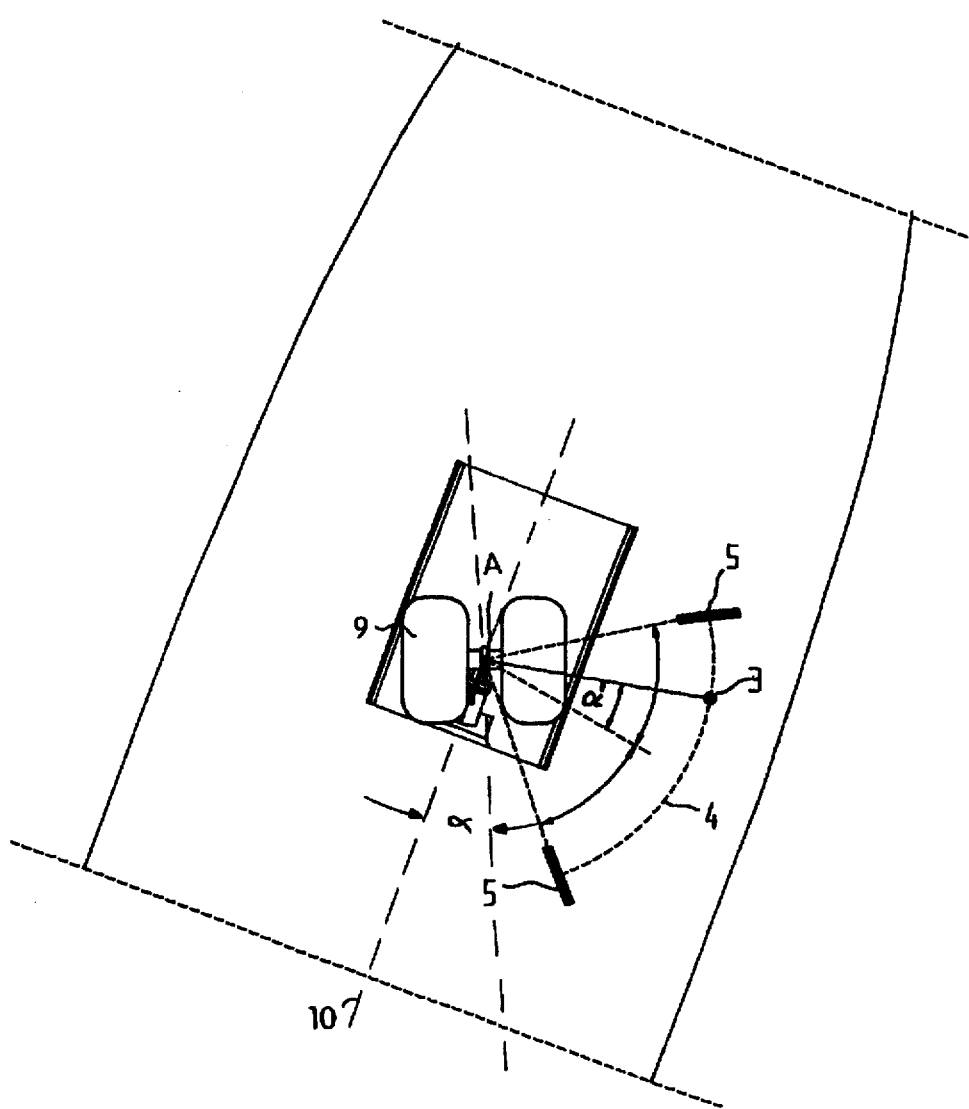
FIG. 3 is a bottom view of parts of the aircraft of FIGS. 1 and 2 showing operation of a device according to the present invention.

The unit 1 is preferably disposed on the vehicle 8 at a predetermined distance from the substantially vertical axis A—A of turning of the nose wheels 9 so that the laser beam 2 hits specific areas on the surface of the body of the aircraft at different steering angles α (see FIG. 3). The steering angle α is the angle between the nose wheel 9 and the longitudinal axis 10 (see FIG. 1) of the aircraft and typically varies from 0° to±about 60°–80° (maximum).

The laser beam (or other beam) 2 is transmitted in a substantially vertical direction. When the vehicle 8 is of the conventional type with a tow bar the unit i is disposed on the tow bar. The unit 1 is placed on the vehicle 8 in a position such that it accurately moves with the vehicle 8 and nose wheels 9 as they turn during "towing".

When the vehicle 8 shown and the nose wheels 9 turn in relation to the longitudinal axis 10 of the aircraft 7, the impact spot 3 of the beam 2 on the surface of the aircraft 7 will describe an arc 4. An optical receiver is part of the unit 1. The receiver is only sensitive to the modulated light from the laser of the unit 1, or other collimated radiation if a laser is not used. The receiver is disposed to detect the diffuse (e.g. laser) light reflected from the spot 3. The output signal from the receiver will hence be proportional to the reflection coefficient of the surface of aircraft 7 along arc 4 where the (laser) beam hits.

According to one embodiment of the present invention, the color of the surface, which is along the arc 4, of aircraft 7 is light, the light arc-traversing surface corresponding to values of the steering angle α which are permitted, whereas dark (e.g. black) areas 5 are provided at the ends of the arc-traversing surface illuminated by the (laser)beam 2. The black areas 5 corresponds to values of the steering angle α which are not permitted (e.g. approaching the angle that would damage the nose wheels 9, typically approaching about 60°–80°, but varying for different types of nose wheels 9). That is at least two significantly different collimated radiation reflectivity areas (along arc 4, and at areas 5, or off the plane 7) are provided. Thus, the output signal from the optical receiver of unit I will decrease rapidly when the limit for permitted steering angle α has been exceeded (e.g. the (laser) beam 2 hits one of the black areas 5). When the output signal is below a predetermined level corresponding to the non-permitted values of the steering angle α, a warning indicator 12 (see FIG. 1) (e.g. an alarm or a light), for instance, may be activated thereby alerting the vehicle 8 operator. Alternatively, or in addition, the output signal may be used to automatically take corrective action, e.g. by decreasing the fuel supply to the vehicle 8, or applying its brakes, or locking its steering mechanism, e.g. by using a conventional computer controller 13 (see FIG. 1).

FIG. 3 shows the position 3 of a beam from a unit 1 when the wheels 9 are disposed at an acceptable steering angle α (e.g. about ±20° in FIG. 3). The dark areas 5 are provided at±about 45° in FIG. 3, providing a safety margin (assuming that damage to the nose wheels 9 occurs when angle or α' exceeds between about 60°–80°). Note that the actual angle α' being measured in FIG. 3 is displaced 90° from the real steering angle α.

The output signal from the optical receiver of unit 1 also varies in relation to the distance from unit 1 to the body of the aircraft 7. Since aircraft vary in size proportional to the distance between the unit/receiver 1 and the body of the aircraft 7, the level of the output signal (within the permitted area along arc 4) also can be used to determine the size of the aircraft 7.

According to another embodiment of the invention two laser beams (or like collimated radiation sources) are used which can be distinguished by one or more receivers, each laser beam describing its own arc on the surface of the body of the aircraft 7 as explained above. The black areas (5) are displaced a certain angle in relation to a towing operation straight forwardly by the vehicle 8 (i.e. steering angle α=0). Then, by determining which one of the beams first hits a black area (5) the exceeding side can also be determined. Further, if a plurality of dark (e.g. black) areas are disposed between the dark (e.g. black) end areas 5 then the steering angle can be measured in the same way as angle indicators for rotating shafts.

Under certain circumstances it is possible to position the unit or units 1 so as to utilize the fact that no light is reflected when the (laser) beam or beams thereof has or have moved entirely past the body of the aircraft 7 so that the output signal disappears when the maximum permitted steering angle α is exceeded. In that case the ends or an end of the aircraft 7 surface takes the place of one or both dark areas 5.

Indications or signs which form areas with different colors, for instance, as described above, can alternatively be disposed on the doors 6 covering the nose gear and nose wheels 9 during flight, these areas being in position for reflecting a (laser) beam from unit 1 when the doors 6 are opened. In this case the (laser) beam from unit 1 is not directed entirely vertically, but rather at an angle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combination of a wheeled transporting vehicle and aircraft, comprising:
    an aircraft having a nose wheel, and a surface defining at least tow significantly different collimated radiation reflectivity areas;
    a wheeled vehicle for operatively engaging said nose wheel and transporting said aircraft on the ground;
    at least one source of collimated radiation mounted for movement with said wheeled vehicle, for directing a beam of collimated radiation from said wheeled vehicle toward said aircraft surface so that the beam may be reflected off said aircraft surface;
    at least one receiver for receiving reflected collimated radiation;
    said at least one receiver generating an output signal that is proportional to the reflection coefficient of the aircraft surface at a particular one of a plurality of spots along the aircraft surface where the radiation may hit the aircraft surface, wherein said spots along the aircraft surface correspond to a range of nose wheel steering angles; and
    a controller communicating with said receiver, said controller actively determining whether the nose wheel steering angle is within an acceptable range in accordance with an amount of received reflected collimated radiation based on said receiver output signal.

2. A combination as recited in claim 1 wherein said source comprises a light source; and wherein said surface on said aircraft comprises an arc of light material, and areas displaced at least about 40 degrees from the center of the arc on either side thereof of dark material or exterior of said aircraft surface.

3. A combination as recited in claim 1 wherein said source comprising a laser beam emitting unit; and wherein said laser beam emitting unit is horizontally displaced from said nose wheel received by said vehicle, and is positioned so that said laser beam is substantially vertically directed.

4. Apparatus for determining the acceptability of the steering angle between the nose wheel of an aircraft and the longitudinal axis of the aircraft during transportation of the aircraft on the ground using a wheeled vehicle, the aircraft having a surface defining at lest two significantly different collimated radiation reflectivity areas, comprising:
    a wheeled vehicle for operatively engaging the nose wheel of the aircraft and transporting the aircraft on the ground;
    at least one source of collimated radiation mounted for movement with said wheeled vehicle, for directing a beam of collimated radiation from said wheeled vehicle toward an aircraft surface when an aircraft is received by said wheeled vehicle so that the beam may be reflected off an aircraft surface;
    at least one receiver for receiving reflected collimated radiation;
    said at least one receiver generating an output signal that is proportional to the reflection coefficient of the aircraft surface at a particular one of a plurality of spots along the aircraft surface where the radiation may hit the aircraft surface, wherein said spots along the aircraft surface correspond to a range of nose wheel steering angles; and
    a controller communicating with said receiver, said controller actively determining whether the nose wheel steering angle is within an acceptable range in accordance with an amount of received reflected collimated radiation based on said receiver output signal.

5. Apparatus as recited in claim 4 wherein said source of collimated radiation is horizontally displaced from a nose wheel received by said vehicle, and is positioned so that said beam is substantially vertically directed.

6. Apparatus as recited in claim 4 wherein said source of collimated radiation comprises a laser beam emitting unit.

7. Apparatus as recited in claim 6 further comprising an indicator communicating with said controller for indicating when said receiver receives insufficient reflected radiation, said indicator indicating that an aircraft nose wheel steering angle is unacceptable.

8. Apparatus as recited in claim 6 wherein said laser beam emitting unit is horizontally displaced from a nose wheel received by said vehicle, and is positioned so that said laser beam is substantially vertically directed.

9. Apparatus as recited in claim 6 further comprising means for automatically taking corrective action when said receiver receives insufficient reflected radiation, indicating that an aircraft nose wheel steering angle is unacceptable.

10. A method of determining the acceptability of the steering angle between the nose wheel of an aircraft and the longitudinal axis of the aircraft during transportation of the aircraft on the ground using a wheeled vehicle having a source of collimated radiation, the aircraft having a surface defining at lest two significantly different collimated radiation reflectivity areas, said method comprising the steps of:
    (a) while the wheeled vehicle operatively engages the nose wheel of the aircraft and can effect change in the steering angle thereof, directing a collimated beam of radiation from the wheeled vehicle source toward the surface of the aircraft defining at least two significantly different collimated radiation reflectivity areas;
    (b) receiving by a receiver collimated radiation reflected from the aircraft surface;

(c) generating a receiver output signal that is proportional to the reflection coefficient of the aircraft surface at a particular one of a plurality of spots along the aircraft surface where the radiation may hit the aircraft surface, wherein said spots along the aircraft surface correspond to a range of nose wheel steering angles; and (d) in response to said receiver output signal, actively determining if the nose wheel steering angle is within an acceptable range.

11. A method as recited in claim 10 wherein steps (a) and (b) are practiced by directing a laser beam toward the surface of the aircraft, and receiving or not receiving on the wheeled vehicle reflected laser light from the laser beam.

12. A method as recited in claim 10 wherein step (b) is practiced by receiving or not receiving reflected radiation from the collimated beam on the wheeled vehicle.

13. A method as recited in claim 10 wherein the wheeled vehicle is of the type having a tow bar, and wherein steps (a) and (b) are practiced by directing the collimated beam from the tow bar toward the surface, and receiving or not receiving the reflected radiation from the collimated beam on the tow bar.

14. A method as recited in claim 10 wherein the wheeled vehicle is of the type not having a tow bar, and wherein step (a) is practiced by directing the beam substantially vertically from a position on the wheeled vehicle horizontally displaced from the nose wheel.

15. A method as recited in claim 10 comprising the further step (c) of activating an alarm if during the practice of step (b) it is determined that the steering angle is outside of an acceptable range.

16. A method as recited in claim 10 comprising the further step (c) of automatically taking corrective action if during the practice of step (b) it is determined that the steering angle is outside of an acceptable range.

17. A method as recited in claim 10 wherein the collimated beam of radiation comprises a first beam; and comprising the further steps of: (c) directing a second beam of collimated radiation toward the aircraft; and (d) in response to radiation from the second collimated beam, or lack thereof, reflected from the surface of the aircraft, combined with reflected radiation, or lack thereof, from the first collimated beam, determining if the nose wheel steering angle is within an acceptable range.

18. A method as recited in claim 10 comprising the further step of using the value of reflected radiation sensed in step (b) to determine the distance of the source of radiation to the surface of the aircraft.

19. A method as recited in claim 10 wherein the surface includes an arc of light material and areas displaced at least about 40 degrees from the center of the arc on either side thereof of dark material or exterior of the aircraft surface; and wherein step (a) is practiced by directing collimated light toward the surface, and step (b) is practiced to receive reflected light from the light material, but little or no reflected light from the dark material or exterior of the aircraft surface.

20. A method as recited in claim 19 wherein step (a) is practiced by directing a laser beam toward the aircraft surface.

* * * * *